UNITED STATES PATENT OFFICE.

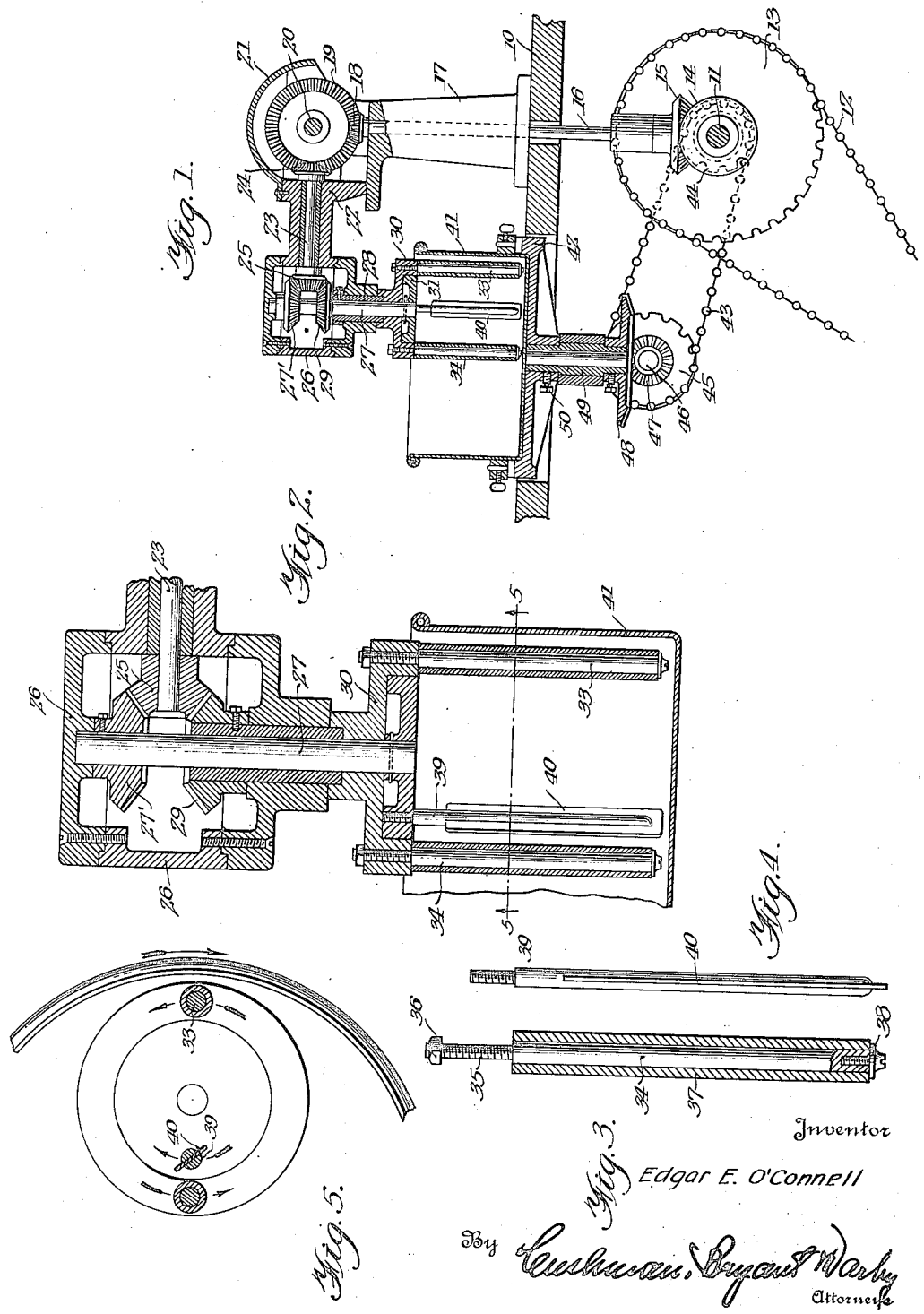

EDGAR E. O'CONNELL, OF WASHINGTON, DISTRICT OF COLUMBIA.

DOUGH-MIXING MACHINE.

Application filed April 7, 1923. Serial No. 630,563.

*To all whom it may concern:*

Be it known that I, EDGAR E. O'CONNELL, a citizen of the United States, residing at Washington, in the District of Columbia, have invented new and useful Improvements in Dough-Mixing Machines, of which the following is a specification.

This invention relates to dough mixing machines of the type comprising, broadly, two series of revoluble stirring rods revolving in counter-direction to each other within a receptacle, which, preferably, has a rotary motion about an axis of rotation different from the axes of rotation of the stirring rods. The type of machine with which the invention has to do is disclosed in the patent to Bachman, No. 1,217,082, February 20, 1917, and my invention relates more particularly to the construction and operation of the stirring rods.

An object of the invention is to provide a device in which the stirring rods are arranged and constructed so that the dough will be thoroughly agitated and will not stick or adhere to the stirring means.

A further object of the invention is to accomplish the mixing without cutting or breaking the dough.

In using a machine of the type mentioned, it has been found that there is a tendency for the dough to collect around the central or inner stirring arm, and there results, as a general rule, an area of dough which is not properly mixed. Moreover, the outer arms which are rigidly supported upon a rotatable member so that they travel through a circular path have a tendency to collect dough and to cut and break the same.

These objections to the device are overcome by arranging the stirring arms so that they are independently rotatable, each about its own axis. The central or inner arm is provided with a blade-like extension adapted to pass in relatively close proximity to the outer arms in order to remove the dough which may collect on these arms.

In the drawings, wherein the one embodiment of the invention is illustrated in connection with as much of the machine proper as is necessary, in order to make clear the application of the features to which the invention relates:—

Figure 1 is a sectional elevation.

Figure 2 is a vertical section of the stirring mechanism proper.

Figure 3 is a longitudinal section of one of the outer stirring arms.

Figure 4 is an elevational view of the inner stirring arm, and

Figure 5 is a diagrammatic view illustrating the movement of the receptacle and stirring members.

Referring to the drawings more in detail, 10 indicates the usual support beneath which is positioned a shaft 11, mounted in suitable bearings (not shown) and driven by means of a chain 12, passing around a sprocket 13, upon the shaft and through which the shaft is driven. Upon the shaft 11 is fixedly mounted a beveled gear 14, meshing with a gear 15, upon a vertical shaft 16 extending upwardly through the platform 10 and a bearing bracket 17, the upper end of the shaft having a beveled gear 18 meshing with a gear 19 upon a horizontal shaft 20. The gears 18 and 19 are located in a housing 21, upon a horizontal bearing arm 22, through which extends a shaft 23 driven from gear 19 and a bevel gear 24, upon the end of the shaft. The outer end of shaft 23 carries a bevel gear 25 positioned in a housing 26, within which is arranged a shaft 27 extending through a sleeve 28; upon the upper end of the sleeve is positioned a beveled gear 29 meshing with the gear 25. The sleeve upon the exterior of the housing carries a rotatable disk 30, the under surface of which is recessed to receive a disk 31 positioned upon the lower end of shaft 27, the latter mentioned shaft being rotated from horizontal shaft 23 through a beveled gear 27' upon its upper end. It will be noted that the disks 30 and 31 are driven in reverse directions and the former carries a series, in the present instance two, stirring arms 33, which revolve with the disk 30. Each stirring arm is arranged for independent rotation about its own axis, and for this purpose it has a center pin 34 having a threaded end 35, which extends through the disk and is rigidly held thereon as my means of a bolt 36. A sleeve 37 is loosely mounted on the pin and is rotatably supported by means of an end abutment screw 38 of slightly larger diameter than the pin, so that its head supports the sleeve upon the pin. Obviously, the stirring arms could be constructed in considerably different manner, in order to effect the desired independent rotation of the arms, but the specific structure has been found to be entirely satisfactory. As the series of arms is revolved with the disk the sleeves rotate and serve to throw off dough which has a tendency to collect on the arms. When a rigid and non-rotatable arm is employed, it has been found that the dough is cut and broken, and moreover adheres to the arm.

Within the series of stirring members described, and upon the disk 31 is eccentrically mounted a stirring member 39, which has a path of travel within the cycle of movement of the series of arms. The stirring member 39 has a blade-like extension 40, which is adapted to pass in relatively close proximity to the outer arms, as the stirring member is revolved counter to the path of travel of the outer series of arms, thus serving to remove from the latter any dough which may collect thereon despite their improved construction.

The blade 40 is arranged so that its flat surface or face substantially parallels the axis of rotation of the disk 31, as will be noted from an inspection of Figure 5, the result being that the face of the blade, and not the edges, is presented to the dough as the arm is revolved. This avoids any tendency for the relatively thin blade to cut the dough, and it will be noted that the edge of the blade passes relatively close to the outer arms so as to dislodge dough which has collected thereon.

The stirring members project into a receptacle 41, which is rotatably mounted upon a suitable platform 42, whereby the receptacle is revolved in a clockwise direction, as indicated in Figure 5. The platform is driven from shaft 11 through chain 43, traversing a sprocket 44 upon shaft 11 and a sprocket 45 upon a shaft 46, the latter mentioned shaft carrying a beveled gear 47 meshing with a beveled gear 48 upon the lower end of a hollow shaft 49 secured to the platform by means of a set screw 50.

It will be understood that the invention is not limited to the specific details illustrated and described, but that such changes may be made therein as come within the scope of the claims which more accurately define the invention.

I claim:

1. In a dough mixing machine, in combination, a receptacle, a series of stirring rods within the receptacle, rotatable sleeves on said rods, said series of rods being revoluble in the receptacle, and at least one stirring rod revoluble within the cycle of revolution of the series of stirring rods and within the receptacle.

2. In a dough mixing machine, in combination, a receptacle, a series of stirring rods within the receptacle, rotatable sleeves on said rods, said series of rods being revoluble in the receptacle, and at least one stirring rod revoluble within the cycle of revolution of the series of stirring rods and within the receptacle, said last mentioned stirring rod having a circular path of travel counter to the direction of travel of said series of rods.

3. In a dough mixing machine, in combination, a revoluble receptacle, means for revolving the receptacle, a series of stirring rods within the receptacle, the individual rods being independently rotatable about their axes, said series of rods being revoluble in the receptacle, and at least one stirring rod revoluble within the cycle of revolution of the series of stirring rods and within the receptacle.

4. In a dough mixing machine, in combination, a receptacle, a series of independently rotatable stirring rods within the receptacle, said series of rods being revoluble in the receptacle, and at least one stirring rod revoluble within the cycle of revolution of the series of stirring rods and within the receptacle, said last mentioned stirring rod having a circular path of travel counter to the direction of travel of said series of rods, and a relatively thin blade-like projection on said last mentioned stirring rod adapted to remove the dough from the rods of said series.

5. In a dough mixing machine, in combination, a receptacle, a series of stirring rods within the receptacle, said series of rods being revoluble in the receptacle, at least one stirring rod revoluble within the cycle of revolution of the series of stirring rods and within the receptacle, said last mentioned stirring rod having a circular path of travel counter to the direction of travel of said series of rods, and a blade on said stirring rod adapted to remove the dough from the rods of said series.

6. In a dough mixing machine, in combination, a receptacle, a series of stirring rods within the receptacle, said series of rods being revoluble in the receptacle, at least one stirring rod revoluble within the cycle of revolution of the series of stirring rods and within the receptacle, said last mentioned stirring rod having a circular path of travel counter to the direction of travel of said series of rods, and a relatively thin projection on said stirring rod adapted to remove the dough from the rods of said series.

7. In a dough mixing machine, in combination, a revoluble receptacle, means for revolving the receptacle, a series of stirring rods within the receptacle, rotatable sleeves on said rods, said series of rods being revoluble in the receptacle, and at least one stirring rod revoluble within the cycle of revolution of the series of stirring rods and within the receptacle.

In testimony whereof I have hereunto set my hand.

EDGAR E. O'CONNELL.